(12) United States Patent
Hanks et al.

(10) Patent No.: US 7,916,164 B2
(45) Date of Patent: Mar. 29, 2011

(54) LABELING METHODS AND APPARATUS USING ENERGY OF TWO WAVELENGTHS

(75) Inventors: D. Mitchel Hanks, Fort Collins, CO (US); Paul Boerger, Loveland, CO (US); Andrew L. Van Brocklin, Corvallis, OR (US); Greg J. Lipinski, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1884 days.

(21) Appl. No.: 11/001,338

(22) Filed: Nov. 30, 2004

(65) Prior Publication Data

US 2006/0114759 A1   Jun. 1, 2006

(51) Int. Cl.
*B41J 2/47* (2006.01)
(52) U.S. Cl. .......................................... 347/240; 347/251
(58) Field of Classification Search .......... 347/224–225, 347/256, 240, 251–254, 236, 246; 369/13.26, 369/13.27, 13.28, 53.21, 53.27
See application file for complete search history.

(56) References Cited

U.S. PATENT DOCUMENTS

| | | | |
|---|---|---|---|
| 4,538,257 A | | 8/1985 | Klinger |
| 5,160,981 A | * | 11/1992 | Hirashima ................ 356/446 |
| 5,191,204 A | | 3/1993 | Dickson et al. |
| 5,436,880 A | | 7/1995 | Eastman et al. |
| 6,067,105 A | * | 5/2000 | Kim ............................ 347/256 |
| 6,295,262 B1 | * | 9/2001 | Kusumoto et al. ......... 369/53.37 |
| 6,424,608 B1 | | 7/2002 | Takeuchi |
| 7,187,637 B2 | * | 3/2007 | Pate et al. .................. 369/53.21 |
| 2003/0193864 A1 | | 10/2003 | Pate |

FOREIGN PATENT DOCUMENTS

| | | |
|---|---|---|
| EP | 0589670 | 3/1994 |
| JP | 2002203321 | 7/2002 |
| JP | 2003178493 | 8/2003 |

OTHER PUBLICATIONS

PCT Search Report dated Mar. 31, 2006, 3 pages.
Taiwan office action dated Sep. 4, 2006 with English translation, for Taiwan patent app. No. 94138101, (5 pages).

* cited by examiner

*Primary Examiner* — Hai C Pham (57) ABSTRACT

A method of measuring a relative darkness of an image recorded on a recording medium, comprising: applying first electromagnetic energy having a first wavelength to the recording medium to record an image thereon, applying second electromagnetic energy having a second wavelength different from the first wavelength to the recorded image on the recording medium, and measuring a reflection of the second electromagnetic energy from the recorded image to determine the relative darkness of the recorded image.

54 Claims, 7 Drawing Sheets

LABELING METHODS AND APPARATUS USING ENERGY OF TWO WAVELENGTHS

BACKGROUND

Low power lasers are employed to read and write binary data on the data side of media. One typical media are optical storage discs, such as CDs, DVDs and the like. Typically, various types of data are written on the data side of the disc by a laser beam while the disc is rotating. Data may be recorded by changing a property of a desired area on the recording media so that the area is indicative of a zero or one data value.

The side of a data disc opposite the data side is often used for handwriting or affixing or marking a label with descriptions and illustrations corresponding to the recorded data. Recently, apparatus and methods have been developed with the ability to generate an optically visible label on the non-data region of an optical disc using the same laser that was employed to read and write digital or electronic data on the data side of the disc. See U.S. Patent Application Publication No. 2003/0108708 (Anderson, et al.), disclosing the use of laser sensitive materials on a disc label that react chemically with the application of light and heat and result in changes in color and shading on the label.

In making marks on a disc using an optical disc drive, the laser power delivered to the media may be reduced over time through, for example, attrition of laser power or contamination build-up on optics associated with the laser. This reduction in laser power may adversely affect the ability of the laser to reliably read or write to the disc or other media. Consequently, the calibration of laser power to front sense diode voltage that was set in the factory may vary significantly during usage. Accordingly, an adjustment of the laser power may be needed to maintain good optical density on the marks being formed on the label areas and reliable recording and detecting of binary data on the data areas.

One approach to adjusting laser power has utilized direct reading of the data recording media during writing (DRDW), in which a detection system monitors the reflection of the write signal during the write operation and measures it against a predetermined standard. Another method uses a method of direct read after writing (DRAW), in which a dual laser beam array provides two overlapping beams of the same wavelength, each of which are monitored by separate detectors. One beam is used for data writing and the other reads the data directly after writing. The power levels of the two overlapping reflected beams are compared to monitor and adjust the power output. In marking on the label side of the disc, using the technology described in the Anderson application, the chemistry on the label is optimized to absorb as much light as possible at the wavelength of the writing laser beam. As a result, there is very little reflectivity of light at the wavelength of the writing laser, and the change in reflectivity between written and unwritten areas is very small. Accordingly, the use of a writing laser to also generate light to measure the reflectivity of the written mark is not likely to yield satisfactory results.

SUMMARY OF THE INVENTION

In one embodiment of the present invention, a method is provided of measuring a relative darkness of an image recorded on a recording medium, comprising: applying first electromagnetic energy having a first wavelength to the recording medium to record an image thereon, applying second electromagnetic energy having a second wavelength different from the first wavelength to the recorded image on the recording medium, and measuring a reflection of the second electromagnetic energy from the recorded image to determine the relative darkness of the recorded image.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In one aspect of the present invention, a write laser generates a laser beam at a first wavelength to make optically visible marks on a light sensitive recording medium, such as a label side of the recording medium. The marks may form text, graphics, images, or a combination thereof that could be used, for example, to describe or represent the data on the recording medium. This imaging technology can be widely used to apply markings to any medium with light sensitive coating. The chemistry of the light sensitive coating is optimized in a manner to absorb as much light as possible at the wavelength of the write laser. Consequently, there is very little light reflected from a beam of the write laser that could be used for measuring the reflectivity of the medium before and after writing.

Accordingly, a separate detection laser is used to generate a laser beam at a second wavelength, different from the first wavelength. The detection laser monitors the image and provides a reflective signal corresponding to the relative darkness of the image. Relative darkness may be measured in terms of optical density (OD) that is the degree of density of a mark forming an image. Since the visual appearance of the mark is important, the optical density of the mark is determined using a detection laser operating with light in the visible spectrum.

The reflective signal is then compared to a reference signal to determine the deviation from the desired optical density. In response to this comparison, the power of the write laser is adjusted to compensate for the power deviation. One embodiment utilizes a write laser with light in the NIR (Near Infrared) wavelengths to activate the medium's chemicals effectively. A visible laser, such as a red laser, is used for the detection laser, emitting light in the visible spectrum in order to monitor the power output of the write laser.

Two Laser System

Figure 1:
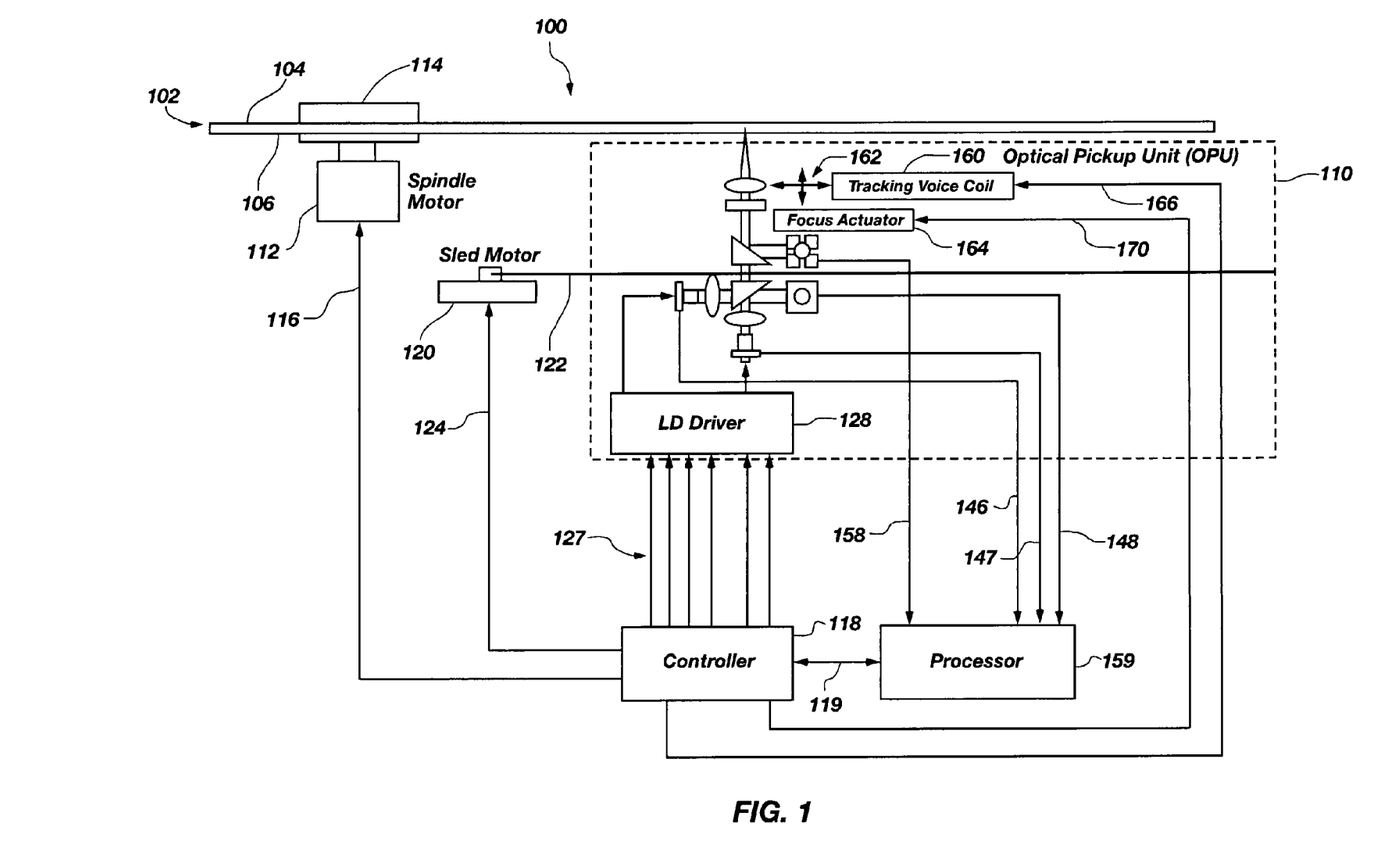
FIG. 1 is a schematic diagram of a laser writing and detection system according to an embodiment of the present invention.
Figure 2:
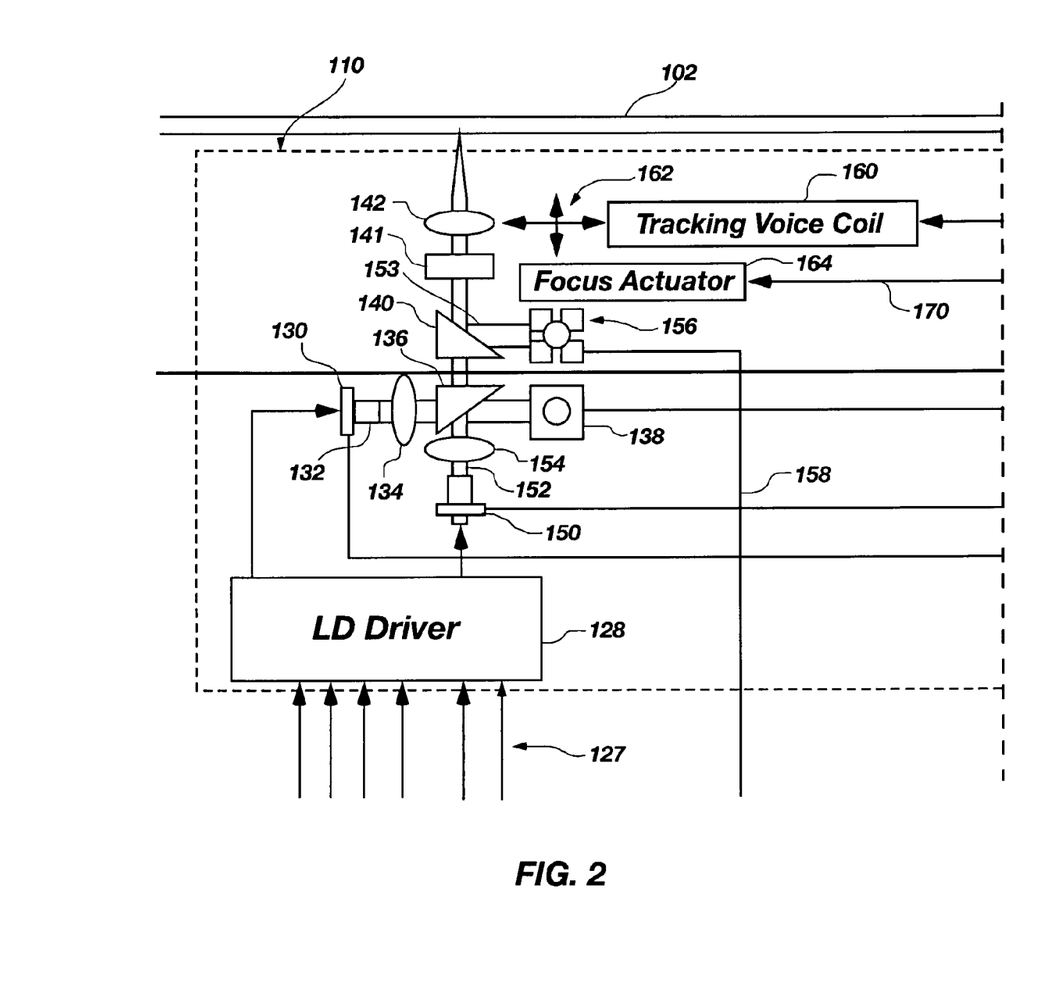
FIG. 2 is a partial schematic view of the diagram shown in FIG. 1.

FIGS. 1 and 2 show a data storage device 100 according to an embodiment of the invention, in which two lasers are used, a write laser for writing optically visible marks on an optical disc and a detection laser for detecting the written marks to determine the results of the write laser. Light beams sent by both lasers converge onto the same path to the disc at different times, so that the optic devices are shared. The two lasers operate at different frequencies—the write laser using a wavelength that will cause effective marking on the medium, and the detection laser using a wavelength that will result in effective detection of the marks made on the medium.

The data storage device 100 is used for reading from and/or writing to an optical disc 102. More specifically, the data storage device 100 is used for reading and/or writing data to an optically writable data side 104 of the optical disc 102. After the data writing operation is completed, in one embodiment, the optical disc is turned over so that the label side 106 of optical disc may be written upon, for the purpose of providing optically visible labeling and otherwise visibly marking the optical disc 102. In another embodiment, the data side and the label side may be the same side of the optical disc. An optical pickup unit (OPU) 110 provides the energy beam, lenses and other devices necessary to provide energy beams for reading and writing the medium, as explained below.

The storage device 100 includes a spindle motor 112 and a spindle 114 for rotating the optical disc 102. Specifically, the optical disc 102 is situated on the spindle 114, which is rotated or moved by the spindle motor 112 to a position specified by an input control signal 116. A controller 118 provides control signal 116, and is comprised of control hardware and/or software.

The storage device 100 further includes a sled motor 120 and a sled rail 122 for moving a sled (not shown) that supports the OPU 110. Specifically, the OPU 110 is situated on the sled that is moved on the sled rail 122 by the sled motor 120 to a given position specified by a sled control signal 124 coming from controller 118.

The OPU 110 writes and reads label data on label side 106 of optical disc 102. In one embodiment, the optical disc 102 is rotated by spindle 114 as the label data is written on optical disc 102. The sled causes the OPU 110 to move radially so that the label data is written in radial increments that may or may not constitute tracks on optical disc 102. The manner of moving the spindle 114 and sled to cause the OPU 110 to write label data is not a part of this invention and may vary in different applications of the invention. Examples of this label writing operation are given in copending U.S. patent application Ser. No. 10/898,392, filed Jul. 23, 2004 entitled "Track Labeling On a Medium," and copending U.S. patent application Ser. No. 10/867,36, filed Jun. 14, 2004 entitled "Detecting Radius Of Optically Writable Label Side of Optical Disc At Which Markings Have Not Been Written."

Again referring to FIG. 1, controller 118 generates laser control signals 127 to a laser diode driver 128 to drive the OPU 110. A tracking voice coil 160 is connected to a fine adjustment mechanism 162 to make small adjustments to the tracking operation of the sled and sled motor 120. Concentric or spiral tracks, such as are typically used on the data side 104 of optical disc 102 may not be needed on the label side 106. Instead, the sled may move in small increments, such as about 150 micron steps, to provide the desired image labeling. A focus actuator 164 is associated with lens 142 to adjust focus of lens 142 as desired. A tracking control signal 166 is directed from controller 118 to the tracking voice coil 160. A focus control signal 170 is directed from the controller 118 to the focus actuator 164.

Next, looking at FIG. 2, the OPU 110 is shown in greater detail. A write laser 130 is disposed to generate a laser beam 132 that is directed to lens 134, changing the diverging beam to a substantially collimated beam. The beam 132 then passes to a dichroic mirror 136 that causes a portion of the beam to be reflected and pass through the polarizing beam splitter 140. The remainder of beam 132 passes through dichroic mirror 136 to a front sense diode 138 that senses the strength of beam 132. After passing through polarizing beam splitter 140, beam 132 is directed through a quarter wave plate 141 and a focusing lens 142 to write on label surface 106 of optical disc 102.

The quarter wave plate 141 changes linearly polarized light from the laser (P polarized) to circularly polarized light. The circularly polarized light is reflected from the disc 102 and is changed back into linearly polarized light (S polarized) by the quarter wave plate 141. The resulting light is at 90 degrees polarization to the original light from the laser. This allows the returned S polarized light to be reflected by the polarizing beam splitter 140. The quarter wave plate 141 is required for the beam splitter 140 to operate.

A detection laser 150 generates a beam 152 that passes through a lens 154, acting to change the beam 152 to a substantially collimated beam. Beam 152 passes through dichroic mirror 136 polarizing beam splitter 140 to impinge upon the image written earlier on label surface 106 by focused beam 132. The reflected beam 153 passes back through lens 142 and quarter wave plate 141 to polarizing beam splitter 140. A portion of the reflected beam 153 is intercepted by four photo-detectors 156. A SUM signal 158 is generated by photo-detectors 156 and sent to a processor 159, shown in FIG. 1. This SUM signal corresponds to the reflected light from the disc surface. Processor 159 is in two-way communication with controller 118 via link 119 to provide feedback for adjustments to the drivers as needed.

In a label writing operation, the write laser 130 may be an infrared diode laser emitting a light beam having a wavelength, in one embodiment, of about 780 nanometers in order to effectively interact with chemicals on the medium and cause image marking to take place. Different wavelength light beams may be emitted in other embodiments to effectively interact with different chemistries for making marks. The detection laser 150 may be a red laser, operating in the visual spectrum of light at about 650 nanometers, in order to detect the visual characteristics and intensity of the marks. The focus actuator 164 and tracking voice coil 160 are used in writing data on the data side 104 of optical disc 102.

When writing to the label side 106, the tracking voice coil 160 may not be used, since there may not be any tracks to follow. The focusing lens 142 may be an objective lens that would be separately focused to accommodate the different wavelengths of the write laser 130 and the detection laser 150. If tracking is used and if radial positioning were held constant, the red and infrared lasers would focus to the same track.

The laser diode driver 128 may utilize a digitally enabled current source set to a selected current value by an external resistor. The four photo-detectors 156 represent four quadrant sensors used to generate servo control signals, that may drive focus and tracking control signals from controller 118.

Calibration of Detection Laser and Optimization of Write Laser

Figure 3:
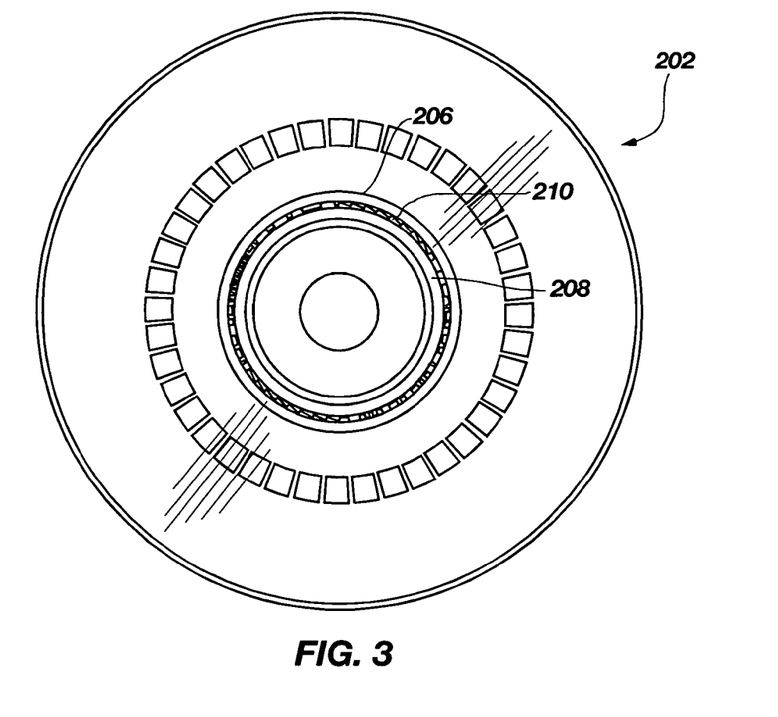
FIG. 3 is a planar view of an optical disc used in connection with an embodiment of the present invention.

In order to optimize the power setting of the write laser, the red laser must first be calibrated. FIG. 3 shows an optical disc 200 including a disc surface 202 having a mirror ring 206 of known reflectivity near the center of disc surface 202. In some embodiments, mirror ring 206 is adjacent to a ring spoke area 208 having spoke edges 210 that may be used for calibration, by gating the calibration signal only over areas of high reflectivity. Alternatively, the disc 200 may not include spoke edges 210.

As discussed with respect to FIG. 2, the beam 152 from the detection laser 150 is directed to the optical disc 102. During calibration, the beam 152 strikes the mirror ring 206 of the optical disc shown in FIG. 3 and is reflected back to the OPU 110. The reflected red laser beam 153 is directed to photo-detector 156 from the mirror area and generates the corresponding SUM signal 158.

Figure 4:
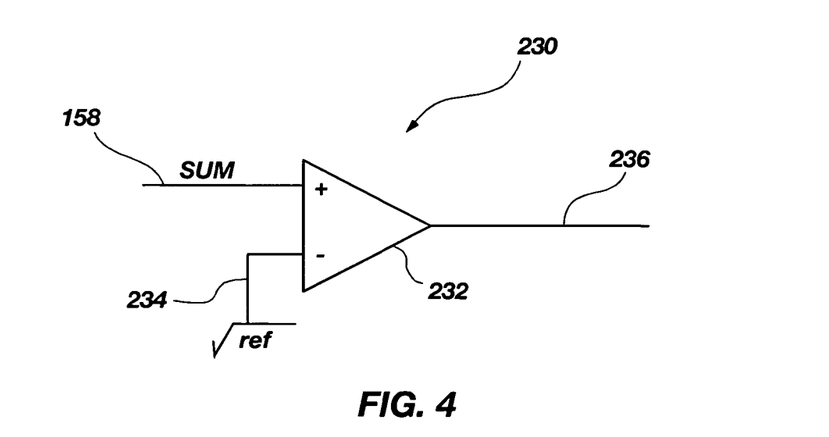
FIG. 4 is a schematic diagram of analog to digital converter circuitry used in connection with an embodiment of the present invention.

With reference now to FIG. 4, the SUM signal 158 is passed through a threshold detector 230 comprising an analog to digital converter 232 having the sum signal 158 as a positive input and a reference signal 234 as the negative input. The output signal 236 is used to calibrate both the detection laser 150 and the write laser 130.

Figure 5:
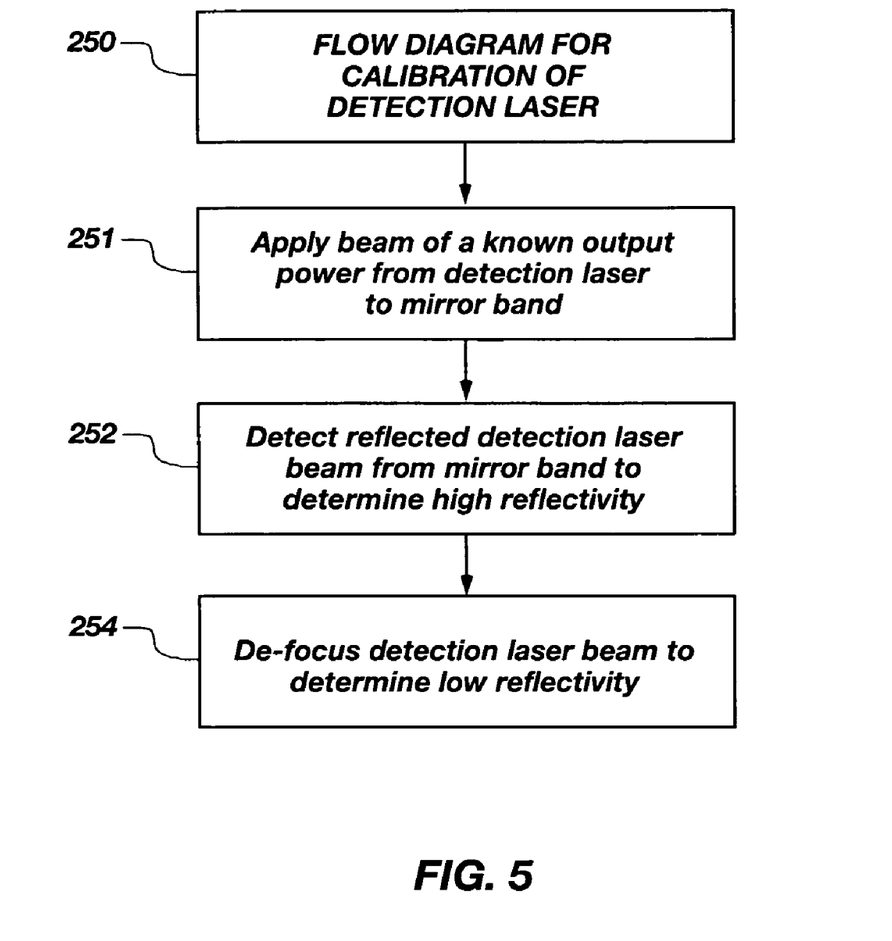
FIG. 5 is a flow diagram of a calibration method used in connection with an embodiment of the present invention.

Referring to FIG. 5, the process 250 for calibrating the detection (red) laser 150 is shown. First, at step 252, light beams are applied from the red laser 150 using a known output power from the red laser. The average amplitude of the SUM signal representative of the beam reflected from the mirror surface is recorded. This average value becomes a reference point that assumes a high reflectivity of the applied power of the laser. Ideally, this high reflectivity might be substantially 100%, but practically a high reflectivity value is likely to be in a range between 75% and 95% of the applied power of the laser. At step 254, the red laser beam may be defocused so that most of the light does not reach the photo-detector, in order to obtain a reference value representative of low reflectivity, ideally 0% reflectivity. Alternatively, the red laser may be calibrated initially during the manufacturing process, to determine the values for substantially 100% and 0% reflectivity. These values correspond to the optical density of a mark on the recording surface, in which a completely reflected light beam (light area) indicates no detection of a mark and a completely unreflected beam (dark area) indicates detection of a mark, respectively. Once the red laser is calibrated, it may not be necessary to re-calibrate the red laser each time the write laser is optimized. Note that it is possible to use a red or other visible color LED as well as a red laser.

Figure 6:
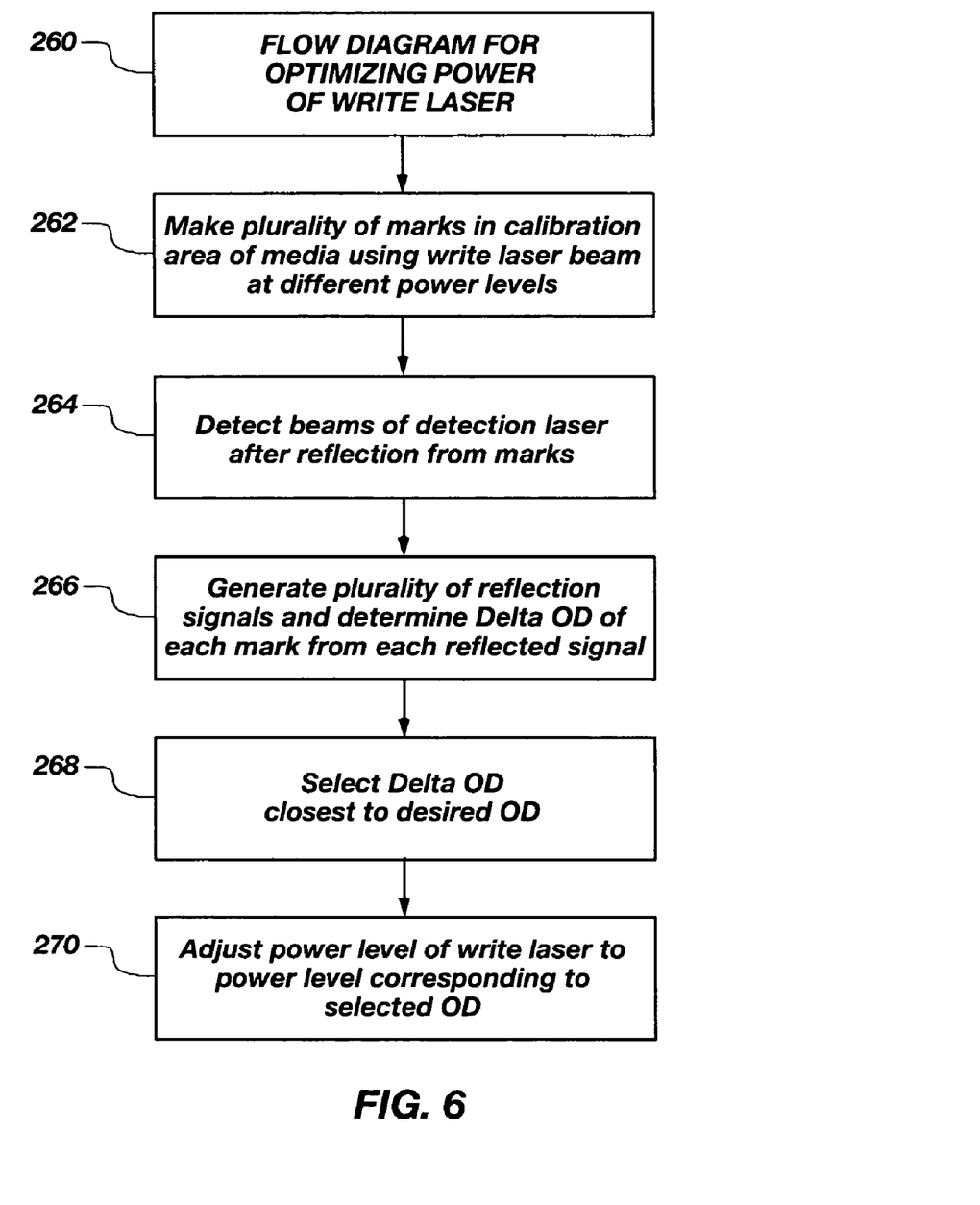
FIG. 6 is a flow diagram of a method of selecting an optimum power level for a write laser according to an embodiment of the present invention.

FIG. 6 is a flow diagram illustrating the process 260 for establishing an optimal power setting for the write laser 130. The power level of the write laser may need to be optimized each time it is used, because of variations in a number of parameters, such as temperature, humidity, media surface and the like. The power of the write laser 130 may be optimized using the calibrated red laser. The write laser 130 is used to make marks on a portion of the recording medium reserved for calibration. This calibration area may be the same as the rest of the medium in the optical disc, or it may have an additional layer that is more suitable for power calibration.

At step 262, the write laser is operated at a known set of different power levels to make several marks in the calibration area. At step 264, the detection (red) laser 150 is positioned over the marks and a light beam from the red laser is reflected from each of the marks to the photo-detector. The amplitude of each signal from the photo-detector is representative of the amount of reflection of each reflected beam. In contrast, optical density of a mark is a function of the darkness of a mark. Accordingly, the OD of a mark is inversely proportional to the amplitude of each SUM signal.

Next, at step 266, the optical density of each mark, as represented by the signal from the photo-detector, each corresponding to a mark written with a different write power level, is determined by determining the differences of each signal from the signals representative of optical density values adjusted to substantially 100% and 0% reflectivity. The resultant value is called the delta optical density (delta OD). The delta optical density (delta OD) is the log base 10 of the ratio between the reflected light and the incident light. The OD will increase, and the amplitude of the SUM signal decrease, as the portion of the disk being examined is marked.

At step 268, each of the delta ODs are then compared to a desired delta OD to select the delta OD closest to the desired delta OD, Then, at step 270, the power of the write laser 130 is adjusted to the power level used to write the mark corresponding to the selected delta OD. If the delta OD is lower than the desired delta OD, the power of the write laser is increased. If the delta OD is higher than the desired delta OD, the power of the write laser is decreased. In either case, the power optimization of the write laser may be repeated until the delta OD is substantially at the target value.

An alternate method of determining an optimal power level for the writing laser 130 is to detect the reflection of a single mark and compare it to a desired reflection. The power level of the write laser may then be adjusted in a manner corresponding to the ratio of the detected reflection to the desired reflection. If necessary the process may be repeated until the detected reflection is substantially the same as the desired reflection. Similarly, the above process may be carried out for detected and desired optical densities, rather than detected and desired reflections.

Detection of Optical Density of Marks

After the detection or red laser 150 has been calibrated and the power of the write laser 130 has been optimized for a recording activity, the detection laser 150 may be used to detect marks made by the write laser. This detection activity may be needed to confirm the label contents, to read data embedded in the label for a specified purpose, or for some other reason. The detection laser 150 emits light in the visible spectrum, and the marks on the medium appear light or dark in the visible spectrum. Consequently, the reflected light from the detection laser has a generally inverse correlation to the optical density of the detected marks. In other words, the red laser is able to detect the presence or absence of marks, and their relative optical density, with a relatively high signal to noise ratio (SNR).

Figure 7:
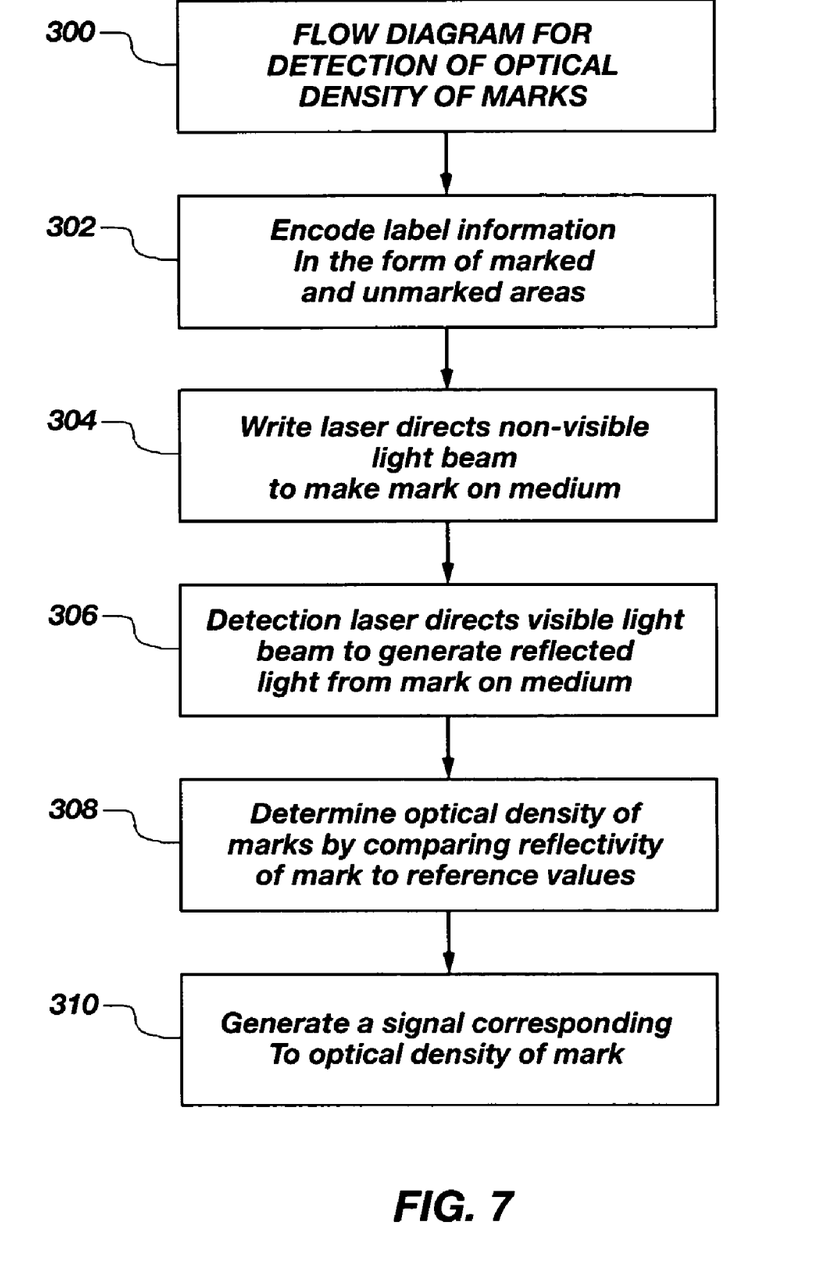
FIG. 7 is a flow diagram of a detection method used in connection with an embodiment of the present invention.

FIG. 7 is a flow diagram showing the process 300 of measuring the relative darkness or the optical density of marks made on a recording medium of the optical disc during a labeling process. First, at step 302, label information is encoded in the form of data representative of marks and non-marked areas. Next, at step 304, the write laser 130 is operated in accordance with the data in order to make one or more marks on the label medium of the optical disc 102. At step 306, the red laser is operated to emit visible beams onto the marked surface of optical disc 102 resulting in reflected light from the medium, including from the marks. At step 308, the optical density of the recorded marks is determined in the same manner as was done during optimizing power of the write laser discussed above in connection with steps 262-268 of FIG. 6. Finally, at step 310, a signal is generated for each mark that corresponds to the Delta OD of that mark, and a determination is made as to whether there is a presence or absence of a mark at each detected location on the medium.

Timing for the labeling process described above may be carried out using a phase-lock loop and read channel. Alternately, the spoke edges of a mirror band, as shown in FIG. 3, may be used to clock the writing and the detection of the label data.

The present invention provides numerous advantages. First, by using two different types of lasers, the write and detection functions can be separated, so that each function may utilize the most efficient laser for the corresponding application. The embodiments of the present invention described herein make it possible to achieve optical power control (OPC) while calibrating the detection laser and the write laser, and while continuing to optimize power of the write laser in the field whenever desired. This system also allows a user to adjust the power level of the write laser to compensate for changes in power output as the write laser ages, as the optics become dirty or covered with ablation, or when a recording medium has different characteristics from the previous medium.

Furthermore, using a detection laser that emits light in the visible spectrum provides an accurate determination of the optical density of the marks and gives a greater SNR than would be the case with a single laser for both the write and detect functions.

In addition, with the present system, information describing the label, such as identification and optical density, may be encoded and written in a dedicated area of the label surface, so that a user might conduct a search for related optical discs or set a read laser to correspond with the optical density of the marks on a disc, respectively. Furthermore, the detection capability of the system described herein may be used to detect whether certain regions of the disc have been marked. This capability enables the system to determine how much unmarked label space is available to be marked. In addition, the detection system of the present invention makes it possible to detect written areas and protect against over-writing of these areas that could disadvantageously result in ablating of label material.

Example of Two-Laser Write and Detection System

Figure 8:
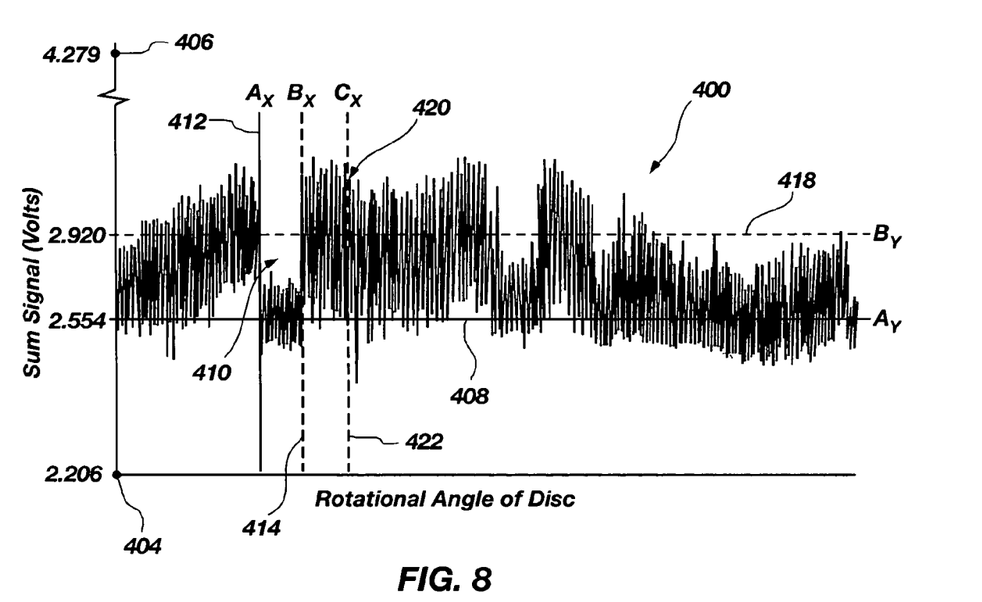
FIG. 8 is a graph facsimile of an oscilloscope scan showing a waveform related to an embodiment of the invention.

Referring now to FIG. 8, a graph is provided as a facsimile of an oscilloscope scan showing a waveform 400 related to one embodiment of the invention. Waveform 400 corresponds to a reflection signal from a laser beam directed to a recording medium to detect the presence of images or marks. In this embodiment, an infrared write laser having a beam with a wavelength of 780 nm was used to deliver energy and make marks on a label recording medium. A model JW2 OPU red laser having a light beam with a wavelength of 650 nm was used to measure reflectivity and hence optical density of the marks. The media had a spatially averaged white light optical density that varies from about 0.44 for unmarked areas to 1.13 for fully marked areas. This corresponds to a SUM signal delta of about 366 mV at 650 nm.

The 780 nm laser was focused on the media and turned on and off at a desired power such as 45 mW and linear velocity such as 0.25 m/s to form marks on the media. This sequence will result in making visible marks on the medium at some point in the sequence. Next, the focusing lens was refocused at the 650 nm wavelength and the detection laser was turned up to a power of about 15 mW. The red detection laser scanned a track or an incremental location on the disc to detect a mark. A second pass may be done to further refine the laser power setting.

In the example shown in FIG. 8, the medium produced a spatially averaged white light optical density of 0.44 for unmarked background and 1.13 for a marked location. The optical disc was rotated at 100 rpm, with the OPU positioned at a 43 mm radius. The laser-off SUM voltage measured 2.2066V (zero level) at 404. The mirror band SUM voltage measured 4.2790V (maximum level) at 406. The unmarked-to-marked SUM delta voltage measured 366 mV.

A lower horizontal marker line 408 (Ay) is set at 2.554 volts to coincide with the average SUM signal returned during a fully marked area. Waveform 410 representative of a marked area is shown between vertical marker lines 412 (Ax) and 414 (Bx). An upper horizontal marker line 418 (By) represents the average SUM signal returned for an unmarked area 420 between vertical markers 414 (Bx) and 422 (Cx) of the disc adjacent to the marked area, and measured at 2.920V. The remainder of waveform 410 beyond marker 422 (Cx) is not relevant to this example. The reflectivity of the mirror band area is estimated at 90%. The value of the signal returned by the OPU at the mirror band is estimated to be 4.2790V. Using these OPU signals, the reflectivity of the unmarked and marked areas at 650 nm are estimated at 38.2% and 18.5% The laser current was set to 100 mA, and the 650 nm laser output light was 14.8 mW. The results of the above example confirm the value of the current invention Previously, optical power control (OPC) has been demonstrated using a 780 nm infrared laser with a signal of 20 ADC counts out of a full-scale value of 4096 ADC counts. This is a signal of 20/4096=0.49% of full scale. The full-scale voltage for the above 650 nm OPC measurement is 4.2790V-2.2066V=2.0724. OPC using the 650 nm laser should show a change in voltage of 4.2790V-2.920V=1.359V. Assuming that the ADC used for OPC has its full-scale set to the voltage returned when over the mirror band, then, as a percentage of full scale, the 650 nm laser OPC gives 0.366/2.0724=17.6%. Compared to the 780 nm red laser OPC, the signal is 17.6%/0.49%=36 times greater. Noise has not been fully characterized for either OPC measurement. However, if the SNR is at a worst case voltage ratio of 2:1 or +6 dB for 780 nm laser OPC, then given the above ratios, the SNR for 650 nm laser OPC would then be +37 db. Note that 6 dB of SNR gives slow and marginal detection of marking, while 37 dB provides for very fast and reliable detection. Accordingly, the system of the example using a red laser for detection provides a large signal-to-noise measurement of 36 times greater than detection with the infrared laser.

It should be understood that the above-referenced arrangements are illustrative of the application for the principles of the present invention. It will be apparent to those of ordinary skill in the art that numerous modifications can be made without departing from the principles and concepts of the invention as set forth in the claims. For example, while the present invention has generally been described herein with reference to an optical disc, it is to be understood that the present invention can be used with other types of media having a light-sensitive surface amenable to labeling via laser light, such as paper or plastic media of any shape with a light sensitive coating thereon.

What is claimed is:

1. A method of measuring a relative darkness of an image recorded on a recording medium, comprising:
   applying first electromagnetic energy having a first wavelength to the recording medium to record an image thereon;
   applying second electromagnetic energy having a second wavelength different from the first wavelength to the recorded image on the recording medium; and
   measuring a reflection of the second electromagnetic energy from the recorded image to determine the relative darkness of the recorded image with a higher signal-to-noise ratio than a reflection of the first energy at the first wavelength.

2. The method of claim 1, wherein the first electromagnetic energy is emitted from a first writing laser.

3. The method of claim 2, wherein the second electromagnetic energy is emitted by a second laser different from the writing laser.

4. The method of claim 3, wherein the second laser emits visible light.

5. The method of claim 1, wherein the measuring step to determine relative darkness comprises determining an optical density of the recorded image.

6. The method of claim 1, further comprising:
comparing the reflection to a reference value.

7. A method of measuring a relative darkness of an image recorded on a recording medium, comprising:
applying first electromagnetic energy having a first wavelength to the recording medium to record an image thereon;
after applying the first energy, applying second electromagnetic energy having a second wavelength different from the first wavelength to the recorded image on the recording medium;
measuring a reflection of the second electromagnetic energy from the recorded image to determine the relative darkness of the recorded image; and
calibrating the reflection of the second electromagnetic energy.

8. The method of claim 7, wherein the step of calibrating the reflection comprises determining a reference of reflection of the second electromagnetic energy from a reference image.

9. The method of claim 8, wherein a level of high reflectivity is determined for a reference of reflection corresponding to the absence of a reference image.

10. The method of claim 8, wherein a level of low reflectivity is determined for a reference of reflection corresponding to the presence of a reference image.

11. The method of claim 8, further comprising the step of comparing the reflection of the second electromagnetic energy from the recorded image to the reference of reflection to determine a difference in optical density between the recorded image and the reference image.

12. The method of claim 11, further comprising the step of changing a power level of the first electromagnetic energy relative to the difference in optical density.

13. The method of claim 12, further comprising changing the power level of the first electromagnetic energy to minimize the difference in optical density.

14. A method of measuring a relative darkness of an image recorded on a recording medium by applying to the recording medium a first light beam at a non-visible wavelength from a first laser in order to record the image on the medium, comprising:
(a) applying a second light beam at a visible wavelength from a second laser to the image previously applied to the recording medium;
(b) measuring an amount of reflection of the second light beam from the image; and
(c) determining the relative darkness of the image by comparing the amount of reflection to a reference value.

15. The method of claim 14, wherein the reference value is an optical density reference value corresponding to an optical density of a reference image.

16. The method of claim 15, wherein the step of determining the optical density comprises determining a delta optical density corresponding to a difference between the optical density reference value and the amount of reflection.

17. The method of claim 16, further comprising calculating the optical density by comparing the delta optical density to the optical density reference value.

18. The method of claim 17, further comprising generating a delta optical density signal corresponding to the delta optical density of the image.

19. The method of claim 18, further comprising adjusting the power level of the first laser in response to the optical density signal, and applying to the recording medium the first light beam at a non-visible wavelength from the first laser.

20. An apparatus for measuring a relative darkness of an image recorded on a recording medium, comprising:
(a) means for applying first electromagnetic energy having a first wavelength to the recording medium to record an image thereon;
(b) means for applying second electromagnetic energy having a second wavelength different from the first wavelength to the recorded image on the recording medium; and
(c) means for measuring a reflection of the second electromagnetic energy from the recorded image to determine the relative darkness of the recorded image with a higher signal-to-noise ratio than a reflection of the first electromagnetic energy at the first wavelength.

21. The apparatus of claim 20, wherein the first electromagnetic energy is emitted from a first writing laser.

22. The apparatus of claim 21, wherein the second electromagnetic energy is emitted by a second laser different from the writing laser.

23. The apparatus of claim 22, wherein the second laser emits visible light.

24. The apparatus of claim 20, wherein means for measuring to determine relative darkness comprises means for determining an optical density of the recorded image.

25. The apparatus of claim 20, wherein the measuring means determines the relative darkness of the recorded image by comparing the reflection to a reference value.

26. An apparatus for measuring a relative darkness of an image recorded on a recording medium, comprising:
(a) means for applying first electromagnetic energy having a first wavelength to the recording medium to record an image thereon;
(b) means for applying, after the first energy, second electromagnetic energy having a second wavelength different from the first wavelength to the recorded image on the recording medium;
(c) means for measuring a reflection of the second electromagnetic energy from the recorded image to determine the relative darkness of the recorded image; and
(d) means for calibrating the reflection of the second electromagnetic energy.

27. The apparatus of claim 26, wherein the means for calibrating the reflection comprises means for determining a standard of reflection of the second electromagnetic energy from a standard image.

28. The apparatus of claim 27, further comprising means for comparing the reflection of the second electromagnetic energy from the recorded image to the standard of reflection to determine a difference in optical density between the recorded image and the standard image.

29. The apparatus of claim 28, further comprising means for changing a power level of the first electromagnetic energy relative to the difference in optical density.

30. The apparatus of claim 29, further comprising means for changing the power level of the first electromagnetic energy to minimize the difference in optical density.

31. An apparatus for measuring a relative darkness of an image recorded on a recording medium, comprising:

(a) a first laser configured to apply first a first light beam having a first wavelength to the recording medium to record an image thereon;
(b) a second laser configured to apply a second light beam having a second wavelength different from the first wavelength to the recorded image on the recording medium;
(c) an optical unit configured to measure an amount of reflection of the second light beam from the recorded image; and
(d) a processor to determine the relative darkness of the recorded image from the amount of reflection of the second light beam at the second wavelength with a higher signal-to-noise ratio than from an amount of reflection of the first light beam at the first wavelength.

32. The apparatus of claim 31, wherein the relative darkness is measured in terms of an optical density of the recorded image.

33. The apparatus of claim 31, wherein the first laser emits infrared light.

34. The apparatus of claim 31, wherein the second laser emits visible light.

35. The apparatus of claim 31, wherein the optical unit comprises a photo-detector to measure the reflection and generate an output signal representative of the reflection.

36. The apparatus of claim 35, wherein the optical unit further comprises optics elements to direct the reflection to the photo-detector.

37. The apparatus of claim 31, wherein the processor determines the relative darkness of the recorded image by comparing the amount of reflection to a reference value.

38. An apparatus for measuring a relative darkness of an image recorded on a recording medium, comprising:
(a) a first laser configured to apply first a first light beam having a first wavelength to the recording medium to record an image thereon;
(b) a second laser configured to apply, after the image is recorded, a second light beam having a second wavelength different from the first wavelength to the recorded image on the recording medium;
(c) an optical unit configured to measure an amount of reflection of the second light beam from the recorded image; and
(d) a processor configured to determine a standard of reflection of the second light beam from a standard image and to determine the relative darkness of the recorded image from the amount of reflection.

39. The apparatus of claim 38, wherein the processor is configured to compare the reflection of the second light beam from the recorded image to the standard of reflection to determine a difference in optical density between the recorded image and the standard image.

40. The apparatus of claim 39, further comprising a controller configured to change a power level of the first light beam relative to the difference in optical density.

41. The apparatus of claim 40, wherein the controller is configured to change the power level of the first light beam to minimize the difference in optical density.

42. A program storage system readable by a computer, tangibly embodying a program, applet or instructions executable by the computer to cause a laser marking system to perform a method for visually marking a recording medium, comprising:
(a) applying a first light beam from a first laser at a first wavelength to the recording medium to record an image thereon;
(b) applying a second light beam from a second laser at a second wavelength different from the first wavelength to the image; and
(c) measuring an amount of reflection of the second light beam from the image, the amount of reflection of the second light beam at the second wavelength indicative of a relative darkness of the recorded image with a higher signal-to-noise ratio than an amount of reflection of the first light beam at the first wavelength.

43. The program storage system of claim 42, wherein the method further comprises adjusting a power level of the first laser in response to the amount of reflection.

44. The program storage system of claim 43, wherein applying the first light beam comprises recording a plurality of images on the recording medium for different power levels of the first laser.

45. The program storage system of claim 44 wherein applying the second light beam comprises applying the second light beam to the plurality of images to obtain a plurality of reflections therefrom.

46. The program storage system of claim 45, further comprising comparing the plurality of reflections to a standard reflection representative of a desired image, so as to select a desired power level representative of a reflection closest to the standard reflection.

47. The program storage system of claim 46, wherein the standard reflection comprises a standard optical density, and further comprising converting the plurality of reflections to a plurality of optical densities.

48. The program storage system of claim 47, further comprising comparing the plurality of optical densities to the standard optical densities to select a desired power level representative of an optical density closest to the standard optical density.

49. The program storage system of claim 43, wherein adjusting the power level of the first laser comprises setting the power level of the first laser at the desired power level.

50. The program storage system of claim 43, wherein the measuring the amount of reflection of the second light beam from the image comprises comparing the measured reflection to a standard reflection to determine a difference in reflection.

51. The program storage system of claim 50, wherein the power level is adjusted to reduce the difference in reflection.

52. The program storage system of claim 42, wherein the method further comprises determining a standard of reflection of the second light beam from a standard image.

53. The program storage system of claim 52, wherein the method further comprises comparing the reflection of the second light beam from the recorded image to the standard of reflection to determine a difference in optical density between the recorded image and the standard image.

54. The program storage system of claim 42, wherein the method further comprises determining from the amount of reflection whether a mark is present on the recording medium.

* * * * *